Figures 1, 2:
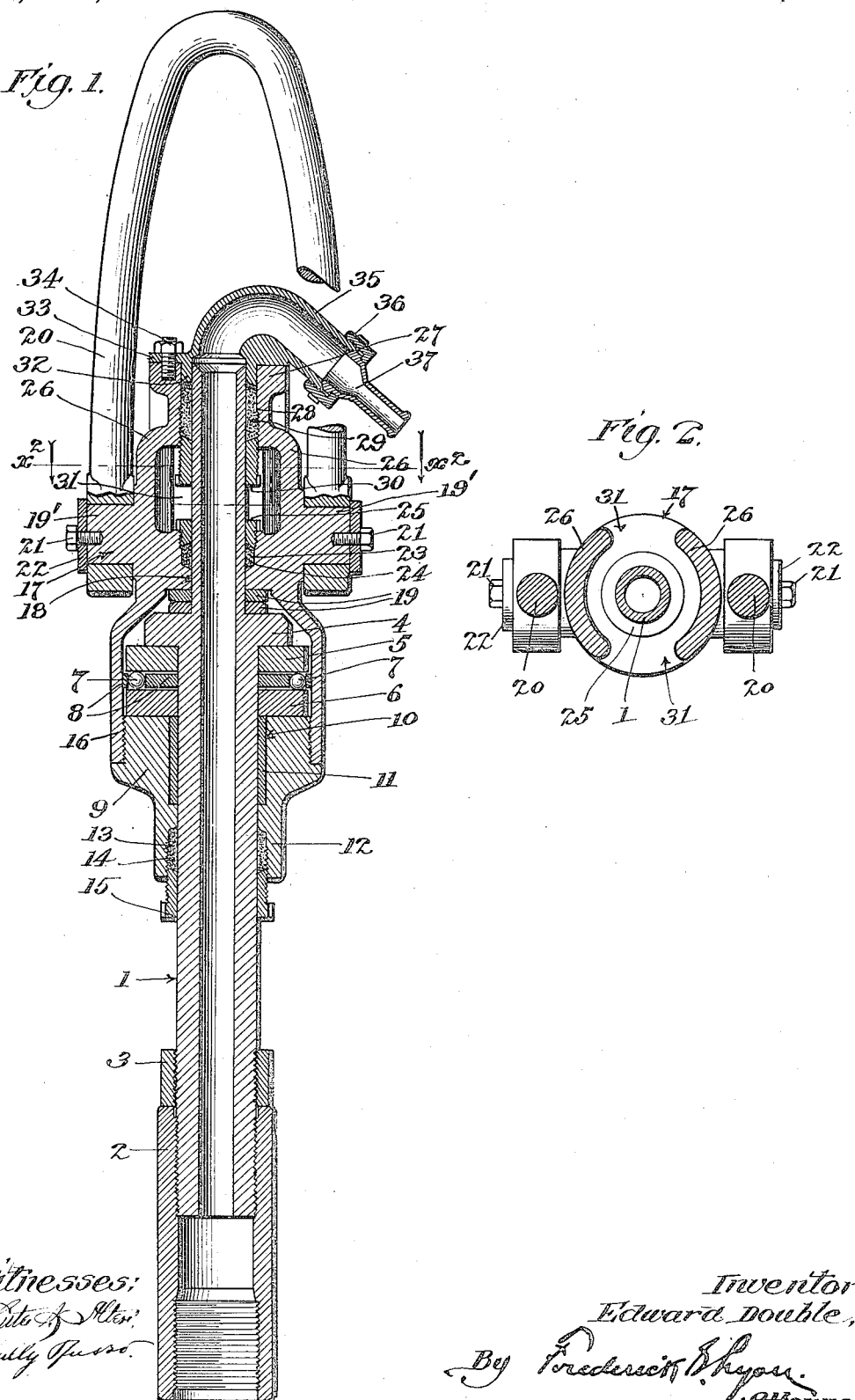

E. DOUBLE.
OIL TIGHT SWIVEL.
APPLICATION FILED JULY 20, 1916.

1,210,615.

Patented Jan. 2, 1917.

Witnesses:

Inventor:
Edward Double,
By Frederick B. Lyon
Attorney

UNITED STATES PATENT OFFICE.

EDWARD DOUBLE, OF LOS ANGELES, CALIFORNIA.

OIL-TIGHT SWIVEL.

1,210,615.  Specification of Letters Patent.  Patented Jan. 2, 1917.

Application filed July 20, 1916. Serial No. 110,266.

*To all whom it may concern:*

Be it known that I, EDWARD DOUBLE, a citizen of the United States, residing at Los Angeles, in the county of Los Angeles and State of California, have invented a new and useful Oil-Tight Swivel, of which the following is a specification.

This invention relates to devices of the character designed to connect a well casing or other pipe to a hydraulic pipe line or hose and an object of the invention is to effect this in such way that the casing can be given a rotary motion by any well known means and leakage of water and lubricating oil cannot occur.

Another object is to so construct the swivel that the packing glands can be readily adjusted to tighten up the packing when such tightening becomes desirable.

Another object is to produce a simplified swivel for hydraulic purposes.

Other objects and advantages will appear in the subjoined detail description.

The accompanying drawings illustrate the invention.

Figure 1 is an elevation mainly in vertical mid section of a swivel embodying the invention. Fig. 2 is a plan section on line indicated by $x^2$—$x^2$, Fig. 1.

There is provided a swivel stem 1 screw-threaded at its lower end so as to be readily connected by a coupling 2 to a string of casing or the like, not shown. Above and engaging the upper end of the coupling 2 is a jam collar or nut 3 screw-threaded onto the swivel stem to lock the coupling 2 against unscrewing. The swivel stem 1 is provided between its ends with an annular abutment or shoulder 4 resting on a collar 5 which surrounds the swivel stem, there being another collar 6 surrounding the swivel stem and there being antifriction bearing members in the form of balls 7 between said collars and there being a suitable cage 8 to hold the balls 7 in spaced relation near the peripheries of the collars. Thus the collars 5, 6, balls 7 and cage 8 form an antifriction bearing. The lower collar 6 is supported by a hollow plug forming a head 9 provided with an axial bore 10 to hold a bushing 11 through which the swivel stem 1 extends. The head 9 is provided with a collar 12 which, as shown in the drawings, may be integral therewith, said collar forming a stuffing box 13 to contain packing 14 held in place by a gland 15 that is screw-threaded into and adjustable relative to said box so as to govern the pressure of the packing against the swivel stem which it engages to prevent leakage of oil between the stem and box. The head 9 forms one member of a hollow trunnion and is screw-threaded into the lower end of a chambered member or jacket 16 of the other trunnion member in which are accommodated the shoulder 4, collars 5, 6, balls 7, ball cage 8 and lubricating oil or grease, not shown. As shown in the drawings the jacket 16 may be integral with the trunnion head 17 provided with an axial bore 18 to accommodate the swivel stem 1, there being one or more washers 19 between the annular shoulder 4 and the head 17 to prevent upward movement of the swivel stem relative to the trunnion.

From the foregoing it is clear that the weight of the swivel stem and the string of casing to which it may be attached is borne by the bearing balls 7 and that said weight is suspended from the trunnion. The trunnion head 17 is provided with pins 19' which may be integral therewith as shown and which are journaled in the lower ends of a clevis or bail 20 so that the swivel can be readily supported by any preferred tackle, not shown, carried by a suitable derrick, not shown. Into the ends of the pins 19 are screw-threaded cap screws 21, there being washers 22 between the heads of said cap screws and the ends of the pins of larger diameter than said pins so as to retain the bail 20 in position on the pins.

The bore 18 of the trunnion head 17 is enlarged at its upper end to form a packing box 23 which is provided with packing 24 held in place and adjusted as required by a gland 25 screw-threaded into said box. Extending up from the head 17 between the box 23 and the pins 19 are arms 26 which may be integral with the head as shown. The arms 26 connect the trunnion head 17 to a collar 27 forming a stuffing box 28 containing packing 29 surrounding the swivel 1, there being a gland 30 to adjustably hold said packing in place. Both of the boxes 23, 28 and their glands 25, 30 are accessible through the interarm spaces or openings 31 so that the packing can be readily renewed or can be tightened up when desired without it being necessary to disturb the other parts of the swivel. The upper or outer end of the box 28 is closed by a bushing 32 which fits inside of the collar 27 and surrounds the upper end of the swivel stem 1, said swivel stem having a turning fit in said bushing and thus being between the box and the stem. The bushing 32 is provided with an annular flange 33 through which extends stud bolts 34 fastened in the collar 27 so as to hold the bushing 32 in place. The bushing 32 and flange 33 may be integral, as shown, with a goose neck 35 adapted to be connected by a suitable union 36 and nipple 37 to a hydraulic supply hose, not shown.

From the foregoing it is readily seen that in practice liquid for hydraulicing is supplied through a hose, not shown, and discharges therefrom directly into the upper end of the swivel stem which is tightly packed to prevent leakage by reason of the box 28, packing 29 and gland 30; and that the liability of leakage of water and also of oil from the oil chamber is reduced to a minimum. It is also obvious that all of the packings and glands are readily accessible through the openings 31 and that when the packing is to be renewed nothing but the glands need be disturbed.

The foregoing will enable those skilled in the art to which the invention appertains to make and use the invention which is understood to be only limited to structure that is within the spirit and scope of the appended claims.

I claim:

1. In combination, a trunnion, a swivel stem having a shoulder, an antifriction device between the shoulder and the trunnion, a box surrounding one end of the swivel stem and connected to the trunnion, a gland for said box, and a goose neck fastened directly to the box and discharging directly into the swivel stem.

2. In combination a trunnion, a swivel stem having a shoulder, an antifriction device between the shoulder and the trunnion, a box surrounding one end of the swivel and connected by arms to the trunnion, and a gland for said box, said box and gland being accessible through the space between said arms.

3. In combination, a trunnion, a swivel stem having a shoulder, an antifriction device between the shoulder and the trunnion, a box surrounding one end of the swivel and connected to the trunnion, a gland to close one end of said box, a bushing between the box and swivel stem, means to hold the bushing in place, and a goose neck integral with the bushing.

4. In combination, a trunnion, a swivel stem having a shoulder, an antifriction device between the shoulder and the trunnion, a box surrounding one end of the swivel and connected by arms to the trunnion, a gland to close one end of the box, said box and gland being accessible through the spaces between the arms, a bushing between the box and swivel stem, means to hold the bushing in place, and a goose neck integral with the bushing.

5. In combination, a trunnion, a swivel stem having a shoulder, an antifriction device between the shoulder and the trunnion, a box surrounding one end of the swivel and connected by arms to the trunnion, said trunnion forming a second box, and glands for the boxes respectively, said boxes and glands being accessible through the spaces between the arms.

6. In combination, a trunnion, a swivel stem having a shoulder, an antifriction device between the shoulder and the trunnion and inclosed by the trunnion, a box connected to the trunnion, said trunnion forming a box above the level of the shoulder and another box below the level of said shoulder, and glands for the boxes respectively, there being an opening between the first named box and trunnion to give access to the gland of said first box and the gland of the upper box of the trunnion.

7. In combination, a trunnion comprising upper and lower members detachably connected to one another, the upper member being chambered and having an opening, a swivel stem, means located in the chamber of the upper trunnion member to journal the swivel stem, boxes formed in the trunnion members respectively, and glands for said boxes, the gland for the upper box being accessible through said opening.

8. In combination, a trunnion comprising upper and lower members detachably connected to one another, the upper member being chambered, a swivel stem, means located in the chamber of the upper trunnion member to journal the swivel stem, intermediate and lower boxes formed in the upper and lower trunnion members respectively, an upper box connected by arms to the upper trunnion member, and glands for the boxes respectively, the glands of the uppermost box and intermediate box being accessible through the space between the arms.

9. In combination, a trunnion comprising upper and lower members detachably connected to one another, the upper member being chambered, a hollow swivel stem, means located in the chamber of the upper trunnion member to journal the swivel stem, intermediate and lower boxes formed in the upper and lower trunnion members respectively, an upper box connected by arms to the upper trunnion member, glands for the boxes respectively, the glands of the uppermost box and intermediate box being accessible through the space between the arms, and a goose neck connected to the upper box and discharging into the bore of the swivel stem.

10. In combination, a trunnion, a swivel stem, means to journal the swivel stem in the trunnion, a box connected with the trunnion, a hose connection connected with the box, and a gland for said box adjustable independently of said hose connection.

11. In combination, a trunnion, a swivel stem, means to journal the swivel stem in the trunnion, a box connected with the trunnion, a hose connection, a second box formed in the trunnion, and glands for the boxes respectively adjustable independently of said hose connection.

12. In combination, a trunnion having a chamber and having a lateral opening, a swivel stem, means in the chamber to journal the swivel stem, a box formed in the trunnion between the opening and chamber, and a gland for said box extending into said opening.

13. In combination, a trunnion having a chamber and having a lateral opening above said chamber, a swivel stem, means in the chamber to journal the swivel stem, boxes respectively above and below the opening, and glands for the boxes respectively.

Signed at Los Angeles, California, this 15th day of July 1916.

EDWARD DOUBLE.

Witnesses:
ANNA F. SCHMIDTBAUER,
L. BELLE WEAVER.